United States Patent
Choi et al.

[19]

[11] Patent Number: 5,961,648
[45] Date of Patent: Oct. 5, 1999

[54] HEATER PREHEATING DEVICE FOR CATHODE RAY TUBE

[75] Inventors: Hyeong-Sik Choi, Kyungki-do; Bong-Rak Choi, Seoul, both of Rep. of Korea

[73] Assignee: SamSung Electronics Co., Ltd., Suwon, Rep. of Korea

[21] Appl. No.: 08/764,070

[22] Filed: Dec. 6, 1996

Related U.S. Application Data

[63] Continuation-in-part of application No. 08/757,677, Nov. 29, 1996, abandoned.

[30] Foreign Application Priority Data

Nov. 30, 1995 [KR] Rep. of Korea ...................... 95/45622
Dec. 6, 1995 [KR] Rep. of Korea ...................... 95/38538
Nov. 6, 1996 [KR] Rep. of Korea ...................... 96/38736

[51] Int. Cl.[6] ........................................................ G06F 1/32
[52] U.S. Cl. .................... 713/323; 713/300; 713/321; 713/320; 713/322; 713/324; 713/330; 348/730
[58] Field of Search ........................ 395/750.01, 750.03, 395/750.05, 750.06, 750.07; 345/211, 212; 363/44; 364/707; 348/730; 713/300, 320, 322, 323, 324, 330; 315/107

[56] References Cited

U.S. PATENT DOCUMENTS

| | | | |
|---|---|---|---|
| 5,163,124 | 11/1992 | Yabe et al. | 395/750.03 |
| 5,335,168 | 8/1994 | Walker | 364/707 |
| 5,345,112 | 9/1994 | Nazarian et al. | 307/443 |
| 5,375,245 | 12/1994 | Solhjell et al. | 395/750.03 |
| 5,389,952 | 2/1995 | Kikinis | 345/212 |
| 5,481,732 | 1/1996 | Shahbazi | 395/750.06 |
| 5,483,464 | 1/1996 | Song | 364/492 |
| 5,486,726 | 1/1996 | Kim et al. | 307/120 |
| 5,555,167 | 9/1996 | Fujihashi | 363/49 |

*Primary Examiner*—Ayaz R. Sheikh
*Assistant Examiner*—Rupal D. Dharia
*Attorney, Agent, or Firm*—Robert E. Bushnell, Esq.

[57] ABSTRACT

A computer having a monitor driving device for controlling video display turn-on time includes a power supply, a computer circuit, a monitor which may be integrated with the computer in one body, and a preheating controller. The monitor driving device for controlling video display time can reduce a time required for displaying a video image again without influencing the life span of a cathode ray tube when power is applied to use the monitor again after previously cutting off the power supplied to the monitor to reduce power consumption by the monitor which may be integrated with the computer in one body.

6 Claims, 4 Drawing Sheets

HEATER PREHEATING DEVICE FOR CATHODE RAY TUBE

CROSS REFERENCE TO RELATED APPLICATION

This application is a continuation-in-part of U.S. application Ser. No. 08/757,677, entitled A COMPUTER HAVING A MONITOR DRIVING DEVICE FOR CONTROLLING VIDEO DISPLAY TURN-ON TIME, filed on Nov. 29, 1996, now abandoned.

CLAIM OF PRIORITY

This application makes reference to incorporates the same herein, and claims all benefits accruing under 35 U.S.C. § 119 and § 120 from Korean Utility Model Application for HEATER PREHEATING DEVICE FOR A CATHODE RAY TUBE earlier filed on Dec. 6, 1995 and there duly assigned Ser. No. 38538/1995, for CATHODE RAY TUBE HEATER PREHEATING DEVICE filed on Nov. 6, 1996 and there duly assigned Ser. No. 38736/1996, and A COMPUTER HAVING A MONITOR DRIVING DEVICE FOR CONTROLLING VIDEO DISPLAY TIME earlier filed on Nov. 30, 1995 and there duly assigned Ser. No. 45622/1995 by the Korean Industrial Property Office.

BACKGROUND OF THE INVENTION

1. Field of the Invention

The present invention relates to a heater preheating device, and more particularly, to heater preheating device for a cathode ray tube adopted to facilitate advanced normal operation at an initial state when turned on.

2. Description of the Related Art

As is well known in the art of contemporary practice for heating up a cathode ray tube, at an initial state when turned on, it takes six to seven seconds to activate a visually emergent image on a screen in normal operation. To activate a cathode for a beam forming operation in a cathode ray tube, a heater must be heated up promptly when power is supplied. Thus, a cathode ray tube is in an abnormal operational state until its heater is sufficiently heated up.

Earlier monitor driving devices include a power supply for supplying power to a computer, a computer circuit operated by the power supply and outputting a video control signal for operating a corresponding device and a monitor operated in response to the control signal outputted from the computer power circuit. The power supply includes a computer supply for supplying the power to the computer circuit and a monitor power supply for supplying power to the monitor in response to a monitor power control signal on the computer circuit.

The monitor includes a monitor circuit operated in response to the power supply from the monitor power supply and the video control signal from the computer circuit and a cathode ray tube (i.e., a CRT) control signal applied to a corresponding device and a cathode ray tube receiving the power from the monitor power supply and operated in response to a cathode ray tube control signal from the monitor to a circuit.

When power is supplied to the power supply, the monitor power supply supplies the power to the monitor circuit and the cathode ray tube. The computer power supply supplies the power for operating the computer circuit. When a video control signal is inputted to the monitor circuit from the computer circuit, the monitor circuit outputs a cathode ray tube control signal to the cathode ray tube signal and is operated in the video image signal corresponding to the video control signal from the computer circuit.

In the earlier monitor driving device, the power consumption by the monitor can be reduced by the monitor power control signal from the computer circuit. The computer circuit outputs a monitor power control signal at a low level to the monitor power supply to reduce the power consumption by the monitor. The monitor supply cuts off the power to the monitor circuit and the CRT, thereby reducing the power consumption while the monitor is not being used. The monitor control signal at high level is from the computer circuit to the monitor power supply to use the monitor again by operating the monitor circuit and the cathode ray tube in which the power was previously cut off. We have found however, the earlier monitor driving device has a disadvantage in that it takes too much time to display the image on the screen of the cathode ray tube due to the heating time of the cathode ray tube when the monitor driving device is turned off by the monitor power control signal and again turned on by the monitor power control signal at the high level after the passage of a predetermined time. We have also noticed that the earlier monitor driving device has another disadvantage in that the life span of the cathode ray tube is reduced when the voltage is continuously applied to the cathode ray tube to preheat the cathode ray tube.

Recent efforts in the art such as the patent to Song, U.S. Pat. No. 5,483,464, entitled *Power Saving Apparatus For Use In Peripheral Equipment Of A Computer*, is but one example of an apparatus for turning off peripheral equipment (such as a monitor) in a computer apparatus to save power in a stand-by state. The Walker patent, U.S. Pat. No. 5,335,168 entitled *Computer System With Power-Down Mode For Monitor*, endeavors to conserve power by powering down the monitor much in the fashion noted above. In addition, as illustrated in FIG. 4 thereof, a diode 70 is utilized to supply a lower than normal voltage to the filament 40 of the cathode ray tube to decrease the period of the time needed for the cathode ray tube to again be operated after being in a stand-by state. However, Walker does not teach or suggest the supplying of the power for the lower voltage being generated by the computer power supply rather than the monitor power supply as in the present invention.

Such an interval for warming up a heater may even deteriorate the utility value of an information that a user wants due to a failure of timely display on the screen of a cathode ray tube in the intelligent society of today.

In an earlier technique for supplying power to a monitor associated with a computer system, a power supply circuit includes a rectifier for rectifying supplied alternating current power and for generating a rectified direct current source voltage, a first power generator for receiving a direct current from the rectifier and for generating power in a at Switching Mode Power Supply SMPS mode, a first power supply, supplied with power from the first power generator, for supplying power to various circuits in a monitor, a second power generator, fed with direct current from the rectifier for generating power in a Switching Mode Power Supply mode and a second power supply, supplied with power from the second power generator, for generating power for use by a computer system.

The rectifier is supplied from a commercially available external power source with alternating current AC (110 Volts/220 Volts ), rectifying and smoothing the supplied power by using a combination of a diode and capacitor, generating rectified power at a constant voltage level of direct current.

The first power generator is supplied with a direct current and generates power in a Switching Mode Power Supply SMPS mode.

The first power supply is supplied with power from the first power generator and supplies power at different voltage levels so as to energize various circuits in a monitor.

The second power generator is supplied with direct current from the rectifier and generates power in a Switching Mode Power Supply mode. The second power supply is supplied with power from second power generator and supplies power at different voltage levels so as to energize various circuits in a computer system.

When an operation of a computer system is suspended for a predetermined time interval, the first power generator supplies no power to the first power supply upon receiving a power saving signal output from a microcomputer (not shown).

A Switching Mode Power Supply SMPS mode is known to a person skilled in the art so that no further explanation will be given to that terminology.

Upon observation of contemporary art as previously described, there is found a drawback.

That is, the first power generator is subject to receive a power saving signal to cut off further power generation when a predetermined time interval during which an operation of a computer system has lapsed into suspension or idleness.

As a result, when back to reuse, it takes a while for warming up a heater again which may result in loss of valuable information. Therefore there is an increased need for effective circuits that facilitate more advanced normal operation of a monitor at an initial state when turned on, thereby ensuring prompt use of a whole computer system.

SUMMARY OF THE INVENTION

Accordingly, it is an object of the present invention to provide an improved heater preheating device.

It is another object of the present invention to provide a heater preheating device for a cathode ray tube to advance a prompt normal operational state when powered on.

It is still another object of the present invention to provide a heater preheating device enabling a heater to keep a constant temperature with a minimum power consumption, thereby securing a prompt operational mode at a normal state when a monitor is turned on.

It is yet another object of the present invention to provide a heater preheating device for a cathode ray tube which is powered by a power source in a computer system associated with a monitor.

It is another object to provide a computer having a monitor driver and process able to reduce the time required to refresh the on-screen visual display of a monitor when re-applying electrical power to the monitor after an interruption of electrical power to the monitor.

It is yet object to provide a monitor driver and process for controlling the time required for video display turn-on to reduce a time required for again displaying a visual video image without influencing the life span of a cathode ray tube when power is re-applied to a monitor after cutting off the power supplied to the monitor during an periodic operation to reduce power consumption by the monitor. Although the monitor power is turned off, the cathode ray tube of the monitor can be preheated by the application of power from the computer power supply.

To achieve these and other objects in accordance with the purpose of the invention, as embodied and broadly described herein, a process and circuit for driving the monitor of a computer may be configured with a computer power supply for supplying power to a computer wherein a monitor may be integrated with the computer in one body, a computer circuit operated by the power supplied from the power supply and for outputting a video control signal for operating a corresponding device, a monitor operated in response to the video control signal from the computer circuit, a monitor power supply for supplying power to the monitor, and a preheating controller for controlling the power supplied to preheat the monitor, said power being supplied by the computer power supply.

To achieve these and other objects, there is also provided a heater preheating device in a display apparatus integrally configured in a unit with a computer system associated therewith. The circuit comprises: a rectifier for generating direct current of substantially constant voltage level; a first power generator for receiving the direct current and for generating first supply power; a first power supply, driven by the first supply power, for generating power for supplying various circuits in a monitor, a second power generator, driven by the direct current, for generating a second supply power: a second power supply, driven by the second supply power, for generating power for supplying various circuits in a computer system: a signal controller for receiving a power saving signal at an input terminal and for generating at an output terminal a control signal for effecting a power saving mode upon determination of an operational mode for the first power generator; and a stand-by power generator for receiving the second supply power from the second power supply and for supplying power to the first power generator upon the detection of no power generation from the first power generator.

In another embodiment, a heater preheating device for a cathode ray tube in a display apparatus associated constructed with an individual computer system constructed according to the principles of the present invention is characterized in that same signal cable is used for power transmission therebetween.

The heater preheating device comprises: a first rectifier for rectifying alternating current supplied to an input terminal of a display apparatus smoothing the rectified current into a direct current at a substantially constant voltage level and generating a smoothed direct current at its output terminal; a first power generator, driven by the direct current, for generating a first supply power; a first power supply, driven by the first supply power, for supplying power various circuits in the display apparatus; a second rectifier for rectifying power supplied to an input terminal of a computer system, smoothing the rectified current to a direct current at a constant voltage level and generating a smoothed direct current at its output terminal: a second power generator, driven by the smoothed direct current, for generating a second supply power; a second power supply, driven by the second supply power, for supplying required power to various circuits in the computer system; and a standby by power generator for enabling power supplied from the second power supply to the first power generator via an electrically conducting path in a signal cable so as to preheat a heater in a cathode ray tube.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENT

Figure 1:
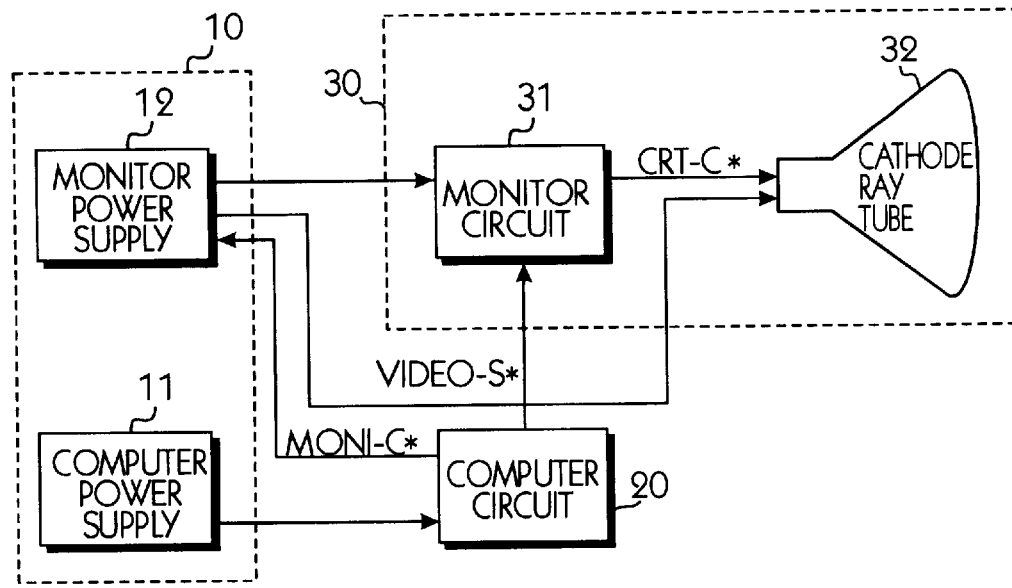
FIG. 1 is a block diagram illustrating salient features of a hypothetical representation of an earlier monitor driver.

FIG. 1 is a block diagram illustrating an earlier monitor driving device constructed with a power supply 10 for supplying power to a computer wherein a monitor is integrated with the computer in one body; a computer circuit 20 operated by the power supplied from the power supply 10 and for outputting a video control signal for operating a corresponding device; and a monitor 30 operated in response to the video control signal from the computer circuit 20. The power supply 10 includes a computer's power supply 11 furnishing electrical power to the computer circuit 20; and a monitor power supply 12 for supplying the power to the monitor 30 in response to a monitor power control signal from the computer circuit 20. The monitor 30 includes a monitor circuit 31 operated in response to the power supplied from the monitor power supply 12 and the video control signal from the computer circuit 20, and outputting a cathode ray tube control signal to a corresponding device; and a cathode ray tube (CRT) 32 for receiving the power from the monitor power supply 12 and operated in response to a cathode ray tube control signal from monitor circuit 31.

The operation of the earlier monitor driving device is explained as follows. When the power is applied to the power supply 10, the monitor power supply 12 in power supply 10 supplies the power to monitor circuit 31 and cathode ray tube 32. Computer power supply 11 supplies the power for operating computer circuit 20. When a video control signal VIDEO-S* is inputted to the monitor circuit 31 in monitor 30 from computer circuit 20, the monitor circuit 31 outputs a cathode ray tube control signal CRT-C* to the cathode ray tube 32.

The cathode ray tube 32 which received the cathode ray tube control signal CRT-C* is operated and displays a video image corresponding to the video control signal VIDEO-S* from the computer circuit 20. In the earlier monitor driving device, the power consumption by monitor 30 can be reduced by the monitor power control signal MONI-C* from computer circuit 20.

A typical operation for reducing the power consumption by the earlier monitor driving device is explained as follows. Computer circuit 20 outputs a monitor power control signal MONI-C* of a low level to the monitor power supply 11 to reduce the power consumption by monitor 30. The monitor's power supply 12 cuts off the power supplied to the monitor circuit 31 and cathode ray tube 32, thereby reducing the power consumption while monitor 30 is not being used.

The monitor control signal MONI-C* of a high level is from computer circuit 20 to the monitor power supply 12 to use monitor 30 again by operating monitor circuit 31 and cathode ray tube 32 in which the power was previously cut off. We have found that the earlier monitor driver suffers from a disadvantage because the driver takes entirely too much time to re-display the image on the screen of cathode ray tube 32 due to the heating time of cathode ray tube 32 when the monitor driving device is turned OFF by the monitor power control signal MONI-C* from the computer circuit 20 and again turned ON by the monitor power control signal MONI-C* of a high level after a passage of a predetermined period of time. In addition, we have observed that the earlier monitor driver has another disadvantage in that the life span of cathode ray tube 32 is reduced when a rated voltage is continually applied to the cathode ray tube 32 to preheat the cathode ray tube 32.

Figure 2:
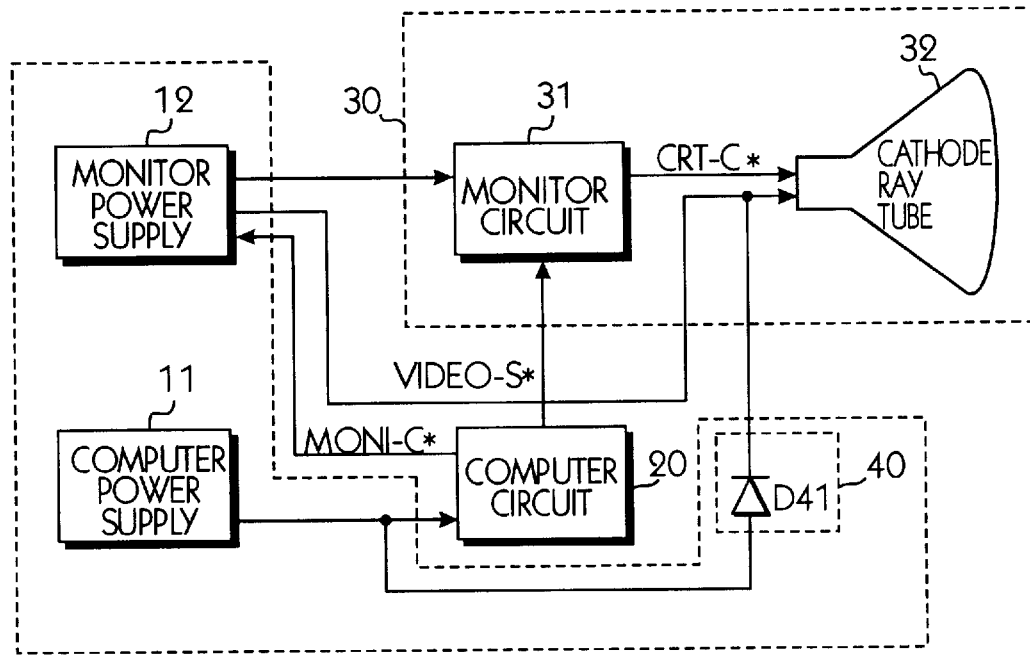
FIG. 2 is a block diagram illustrating a computer having a monitor driver controlling video display time according to the principles of the present invention.

FIG. 2 is a block diagram illustrating a computer having a monitor driving device for controlling video display time according to a preferred embodiment of the present invention. A computer having the monitor driver controlling video display time according to the preferred embodiment of the present invention, may be constructed with a power supply 100 for supplying power to a computer wherein a monitor is integrated with the computer in one body, a computer circuit 20 operated by the power supplied from power supply 100 and for outputting a video control signal for operating a corresponding device, a monitor 30 operated in response to the video control signal from computer circuit 20, and a preheating controller 40, contained within the power supply 100, for controlling the power supplied to preheat the monitor 30. Power is supplied by a computer power supply 11. Power supply 100 may be constructed of a computer power supply 11 for supplying the power to computer circuit 20 and a monitor power supply 12 supplying the power to monitor 30 in response to a monitor power control signal from computer circuit 20.

The monitor 30 includes a monitor circuit 31 operated in response to the power supplied from the monitor's power supply 12 and the video control signal VIDEO-S* from the computer circuit 20, and for outputting a cathode ray tube (CRT) control signal CRT-C* to a corresponding device. Cathode ray tube (CRT) 32 operates in response to the cathode ray tube control signal CRT-C* from the monitor circuit 31. Preheating controller 40 includes a diode D41 having a cathode terminal connected to a node between the monitor's power supply 12 and cathode ray tube 32, and an anode terminal connected to a node between the computer power supply 11 and the computer circuit 20.

The operation of the computer having the monitor driving device for controlling video display time according to the preferred embodiment of the present invention is as follows. When the power is applied to the power supply 100, the monitor power supply 12 in the power supply 100 supplies the power to the monitor circuit 31 and the cathode ray tube 32. The computer power supply 11 supplies the power for operating the computer circuit 20. When a video control signal VIDEO-S* is inputted to the monitor circuit 31 in the monitor 30 from the computer circuit 20, the monitor circuit 31 outputs a cathode ray tube control signal CRT-C* to the cathode ray tube 32.

The cathode ray tube 32 which received the cathode ray tube control signal CRT-C* is operated and displays a video image corresponding to the video control signal VIDEO-S* from the computer circuit 20. The power consumption by the monitor 30 may be reduced by the monitor power control signal MONI-C* from the computer circuit 20. When the monitor power control signal MONI-C* from the computer circuit 20 is high, a reverse-bias voltage is applied to the diode D41 in the preheating controller 40 and current does not flow by making the voltage applied to the cathode ray tube 32 from the monitor power supply 12 higher than the voltage from the computer power supply 11. When monitor power control signal MONI-C* from computer circuit 20 is low however, the voltage supplied from the monitor power supply 12 to the cathode ray tube 32 is cut off The voltage from the computer power supply 11 supplies the power to cathode ray tube 32 through diode D41, whereby a voltage lower than the rated voltage of cathode ray tube 32 continually preheats cathode ray tube 32 even when the monitor power supply 12 is turned off.

Although the monitor power is turned off, the cathode ray tube of the monitor can be preheated by the application of power from the computer power supply.

As described above, a video display time can be reduced by reducing a heating time for operating the cathode ray tube 32 since the cathode ray tube 32 is preheated already when the monitor power supply 12 is again turned ON to use the monitor 30 in which the power is cut off to reduce the power consumption. Preheating controller 40 is not limited to diode D41.

It may be seen that the present invention endows computers with monitor driving devices controlling video display turn-on time, which can reduce the time required for re-displaying a monitor screen when power is again applied to a monitor after a period of interruption of the power to the monitor during an interval of reduced power consumption, with the monitor which may be integrated with a computer in one body. Accordingly, the effect of the computer having the monitor driving device for controlling video display time which can reduce the time required for displaying the video image again without influencing the life span of the cathode ray tube when the power is applied to use the monitor again after cutting off the power supplied to the monitor to reduce power consumption by the monitor which may be integrated with a computer in one body.

Figure 3:
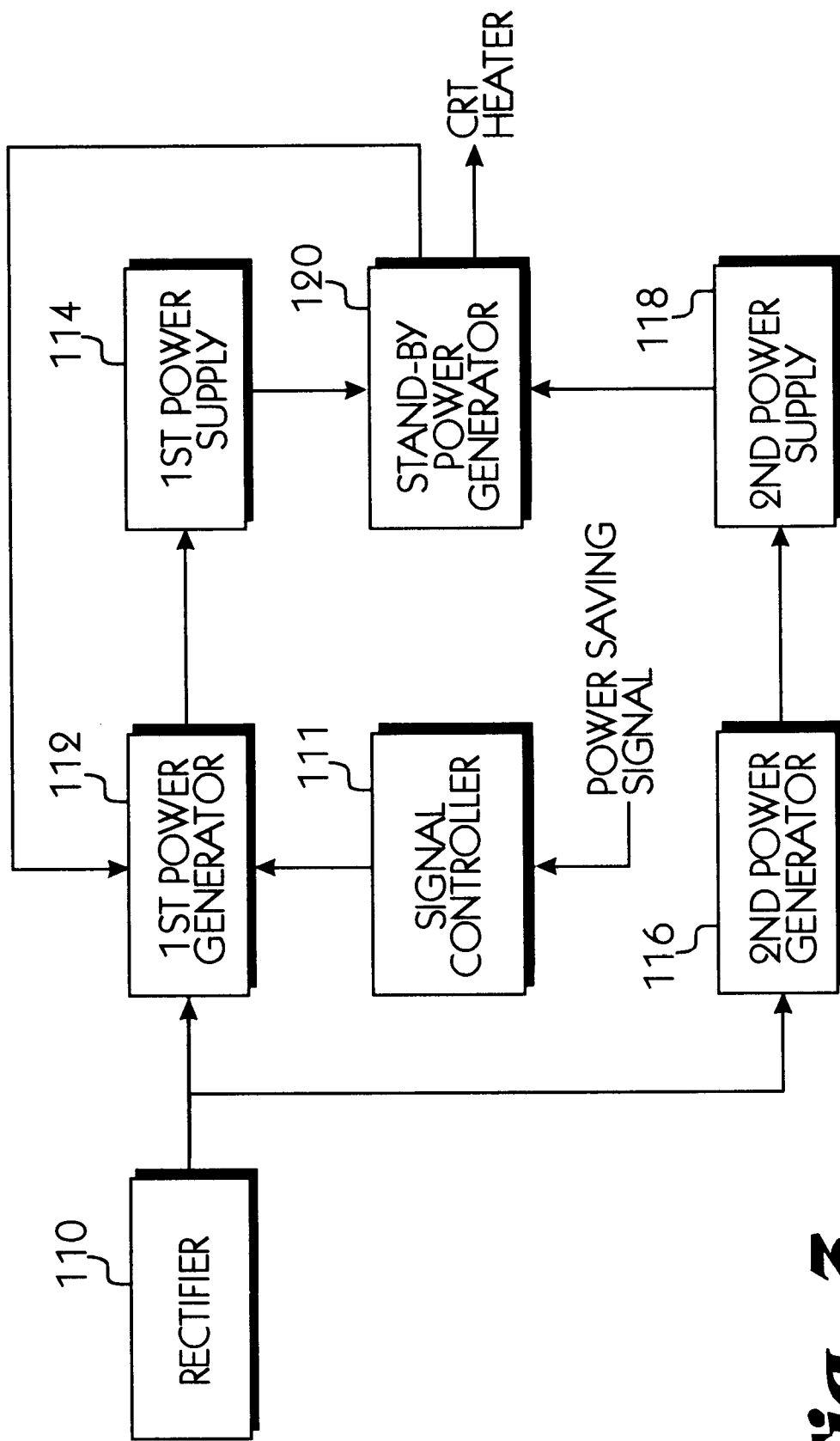
FIG. 3 is an example of a heater preheating device for a cathode ray tube built according to the principles of the present invention.

A schematic block diagram of an embodiment of a heater preheating device for a cathode ray tube built according to the principles of the present invention is illustrated in FIG. 3.

The cathode ray tube is applicable to a computer system in which a display apparatus is integrally associated in a unit with main body.

The device includes: a rectifier 110 supplied with alternating current, rectifying and smoothing the supplied current into a direct current, and generating a direct current at its output terminal: a first power generator 112, driven by the direct current, for generating a first power output in a Switching Mode Power Supply SMPS mode: a first power supply 114, driven by first power generator 112, for supplying power to energize various circuits in a monitor; a second power generator 116, driven by the direct current supplied from the rectifier 110, for generating a second power output in a Switching Mode Power Supply SMPS mode; a second power supply 118, driven by the second power supplied from the second power generator 116, for supplying power to energize various circuits in the main body of a computer system; a signal controller 111 for receiving a power saving signal at its input terminal and for generating a control signal for effecting a power saving mode in the first power generator 112 upon a determination of an operational mode; and a stand-by power generator 120, supplied with power from the second power supply 118, for supplying the supplied power to the first power generator 112 upon a determination of no power generation from the first power generator 112, so as to preheat a heater in a cathode ray tube CRT in the monitor.

Figure 4:
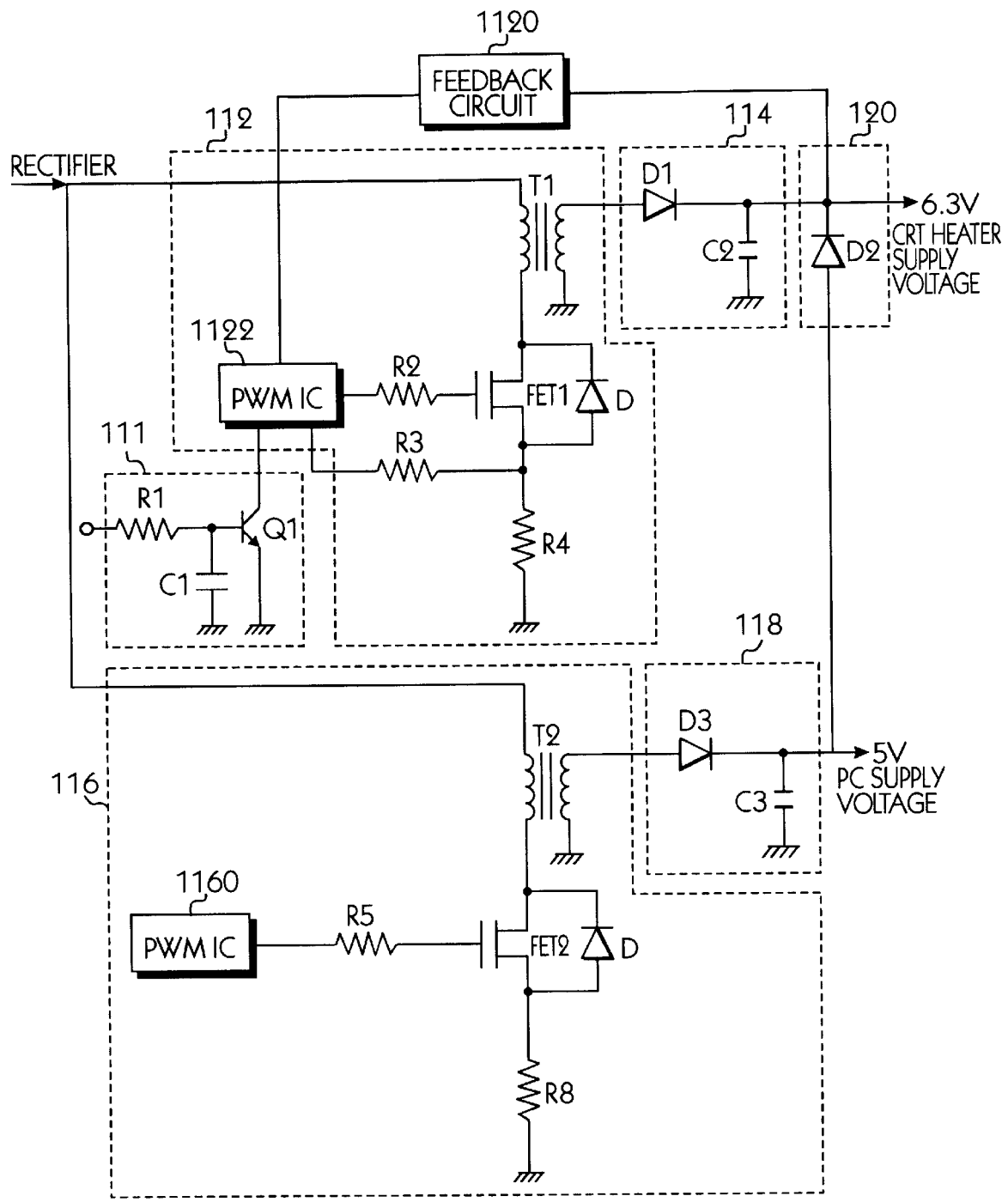
FIG. 4 is a detailed circuit diagram of the heater preheating device in FIG. 1

Now, by way of a non-limiting example, an operation of a preferred embodiment of the present invention will be described in detail in conjunction with FIG. 4. A detailed circuit diagram of the embodiment in FIG. 3 is illustrated in FIG. 4.

As is common in the art, albeit not shown in detail, the rectifier 110 is supplied with commercially available alternating current AC (110V/220V) from an external power source, rectifying and smoothing the supplied current, and generating at its output terminal a direct current DC at a substantially constant voltage level. The first power generator 112 is supplied with the direct current from the rectifier 110 generates power at its output terminal in the Switching Mode Power Supply SMPS mode.

The first power generator 112 includes: a transformer T1 whose input terminal of its primary winding is coupled to the output terminal of the rectifier 110, a field effect transistor FET-1 having its drain electrode D connected to an output terminal of the primary winding of transformer T1 its gate electrode G connected to one end of resistor R2 and its source electrode connected to a junction node between a pair of serially connected resistors R3 and R4, and a Pulse Width Modulation Integrated Circuit PWM-IC 1122 connected to resistors R2 and R3 so as to generate a switching signal for field effect transistor FET-1.

Signal controller 111 generates a control signal which is input to the Pulse Width Modulation Integrated Circuit PWM-IC 1122 upon receiving a power saving mode signal includes a load resistor R1, a capacitor C1 connected between load resistor R1 and potential and a transistor Q1 whose base electrode is connected to a junction node of resistor R1 and capacitor C1 and whose collector is connected to an input terminal of Pulse Width Modulation Integrated Circuit PWM-IC 1122. The first power supply 114 consists of a diode D1 and capacitor C2 so as to supply a power induced across a secondary winding of transformer T1 to circuits connected to the junction node of diode D1 and capacitor C2.

A feedback circuit 1120 is arranged to supply a voltage regulation of the secondary winding of transformer T1 supplied across first power supply 114 to an input terminal of PWM-IC 1122.

The second power generator 110 includes: a transformer T2 whose input terminal of its primary winding is connected to an output terminal of rectifier 110, a field effect transistor FET2 having its drain electrode connected to output terminal of the primary winding of transformer T2, its gate electrode connected to one end of resistor R5 and its source electrode connected to one end of resistor R6, and a Pulse Width Modulation Integrated Circuit PWM-IC 1160 coupled to another end of resistor R5.

The second power supply 118 consists of a diode D3 and capacitor C3 for transmitting power induced across the secondary winding of transformer T2 to circuit connected thereto.

The stand-by power generator 120 include a diode D2 which is arranged to supply a voltage supply of substantially 5 volts supplied from the second power supply 118 via an electrically conducting path in a signal cable to an input terminal of the Pulse Width Modulation Integrated Circuit PWM-IC 1122 in first power generator 112 through feedback circuit 1120.

Now, a detailed explanation will be given to an operation of cathode ray tube CRT as described above. A field effect transistor FET1 in first power generator 112 is turned on and off by a switching pulse signal applied from am output terminal of Pulse Width Modulation Integrated Circuit PWM-IC 1122. Transformer T1 becomes conductive, or non-conductive, in dependence upon switching operation of field effect transistor FET1.

Feedback circuit 1120 is disposed to feedback a voltage regulation of the secondary winding of transformer T1 to Pulse Width Modulation Integrated Circuit PWM-IC 1122, thereby performing a voltage regulation operation. Upon a determination of no signal input, either horizontal signal H-Sync, or vertical signal V-Sync, during a predetermined time interval, a microcomputer (not shown) generates a signal for effecting a power saving mode of operation in a monitor. A power saving mode is divided into three individual states, namely, stand-by mode, suspend mode and off mode.

Each state of the above explained power saving mode are designed for cutting off power supply to specific circuits, thereby reducing power consumption. Upon applying a signal indicating any one state among the stand-by, suspend and off mode, transistor Q1 in signal controller 111 becomes turned on, providing an electrical conduction path between the Pulse Width Modulation Integrated Circuit PWM-IC 1122 and ground, disabling an operation for signal generation from the Pulse Width Modulation Integrated Circuit PWM-IC 1122, thereby in turn causing transformer T1 to become nonconductive.

The first power supply 114 is supplied with an induced voltage supply across the secondary winding of transformer T1, rectifying and smoothing the supplied voltage using the passive elements diode D1 and capacitor C2, and supplying power to various circuits, for example, a voltage of 63 volts for the heater in a cathode ray tube CRT. The second power generator 116 generates power in the Switching Mode Power Supply SMPS mode using a direct current supplied from the rectifier 110. The Pulse Width Modulation integrated Circuit PWM-IC 1160 in the second power generator 116 produces a pulse signal so as to perform a switching operation of field effect transistor FET2, thereby enabling transformer T2 to become conductive.

The second power supply 118 is supplied with a voltage induced across a secondary winding of transformer T2, rectifying and smoothing the voltage supplied by using passive elements diode D3 and capacitor C3, and outputs a voltage, for example, a voltage at substantially 5 volts to energize various circuits in the main body of a computer system. After the passage of a predetermined time interval during which a computer system is out of use or is idling, the first power generator 112 performs a switching operation of field effect transistor FET1, responsive to a power saving signal supplied from a microcomputer, thereby cutting off power transmission across the windings of transformer T1 to the first power supply 114.

As a result, diode D2 in the stand-by power generator 120 becomes conductive by power supplied from the second power supply 118 as soon as the potential level at the junction node of diode D1 and capacitor C2 falls below the threshold voltage level thereof. Thus, the power supplied from the second power supply 118 is fed to the first power generator 112 via diode D2 such that the transformer T1 becomes conductive again thereby allowing 114 to supply power heater.

Figure 5:
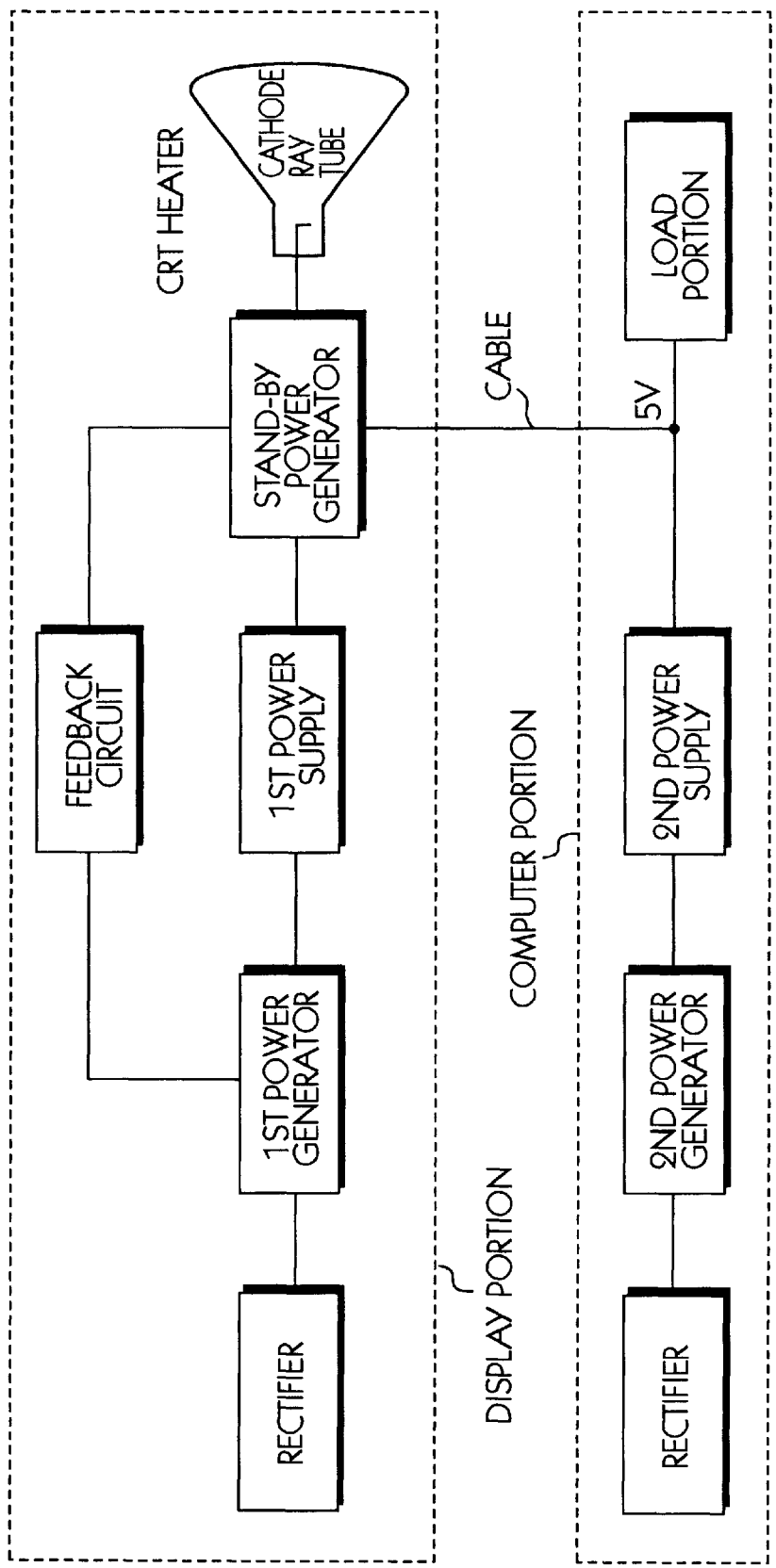
FIG. 5 is another example of a heater preheating device for a cathode ray tube built according to the principles of the present invention.

As previously noted, the preferred embodiment as illustrated in FIGS. 3 and 4 show an embodiment in which a display apparatus and a computer system being united as a single body. It is apparent from the foregoing that the present invention is also applicable to a display apparatus associated with an individual computer system. A schematic block diagram of another embodiment constructed according to the principles of the present invention is illustrated in FIG. 5. The embodiment of FIG. 5 is applicable to a display apparatus associated with computer system via a signal cable.

In the embodiment, an operational function of each of various circuit blocks are similar or identical to that depicted in FIGS. 3 and 4 besides an electrical conduction path via a single cable established between individual apparatus, i.e., a monitor and a computer system . As described above, a heater in a cathode ray tube is preheated at all times when a computer system in use such that a cathode ray tube CRT can be promptly activated to form a bundle of electron beams in a normal operational mode upon application of power to a monitor, enabling one to minimize power consumption, thereby enhancing product efficiency, at a low cost.

While there have been illustrated and described what are considered to be embodiments of the present invention, it will be understood by those skilled in the art that various changes and modifications may be make, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A heater preheating device for use with a cathode ray tube in a display apparatus associated with a computer system in a single unit body, said device comprising:

a rectifier, coupled to an external power source for providing an alternating current to said rectifier, for rectifying and smoothing an alternating current supplied to its input terminal into a direct current at a substantially constant level and for generating a direct current at its output terminal;

a first power generator, driven by said direct current, for generating a first supply power in a Switching Mode Power Supply SMPS mode, and including a Pulse Width Modulation Integrated Circuit PWM-IC and a transformer;

a first power supply, driven by said first supply power, for supplying a driving voltage at its output terminal so as to energize circuits in said display apparatus;

a second power generator, driven by said direct current, for generating second supply power in Switching Mode Power Supply SMPS mode;

a second power supply, driven by said second supply power, for supplying a second driving voltage at its output terminal so as to energize circuits in said computer system;

a stand-by power generator, supplied with said second supply power, for supplying power supplied to said first power generator upon detection of said first power supply being disabled; and a feedback circuit, disposed between said standby power generator and said first power generator, for feeding back a voltage regulation of a secondary winding of said transformer to said Pulse Width Modulation Integrated Circuit PWM-IC.

2. The device of claim 1, said first power generator comprising: a semiconductor having a principal electrically conducting semiconducting channel, a first electrode coupled to a first side of said channel, a second electrode separated from said first electrode by said channel, and a third electrode for controlling electrical conduction between said first electrode and second electrode via said channel, said transformer having an input terminal of a primary winding connected to an output terminal of said rectifier and a second winding connected to said first power supply, said first electrode being connected to an output terminal of said primary winding, said second electrode being connected to a junction between a pair of first and second resistors, said third electrode connected to a terminal of a third resistor, and said Pulse Width Modulation Integrated Circuit PWM-IC being coupled to a terminal of said first resistor and another terminal of said third resistor for supplying a switching signal to said third electrode via said third resistor.

3. The device of claim 2, said Pulse Width Modulation Integrated Circuit PWM-IC being coupled to a PWM signal controller for providing a switching control signal for effecting a power saving mode operation.

4. The device of claim 3, said PWM signal controller further comprising a semiconductor having a principal electrically conducting semiconducting channel, a first electrode coupled to a first side of said channel, a second electrode separated from said first electrode by said channel, and a third electrode controlling electrical conduction between said first electrode and second electrode via said channel, said first electrode connected to an output terminal of said PWM-IC, a second electrode connected to a ground potential and a third electrode coupled to a node, said node connected to an external signal source via a resistor and to said ground potential via a capacitor.

5. A cathode ray tube display apparatus associated with a computer system via a signal cable for establishing an electrical conduction path therebetween, the display apparatus comprising:

a rectifier for rectifying and smoothing alternating current supplied supplied to an input terminal thereof into a direct current at a substantially constant level and for providing said direct current at an output terminal thereof;

a power generator, driven by said direct current, for supplying a first supply power and including a Pulse Width Modulation Integrated Circuit PWM-IC and a transformer;

a power supply, for rectifying and smoothing said first supply power so as to supply a second supply power at its output terminal; and a stand-by power generator for supplying power supplied directly from said computer system to a heater in said tube upon detection of a failure of said first power supply; and a feedback circuit, disposed between said standby power generator and said power generator, for feeding back a voltage regulation of a secondary winding of said transformer to said Pulse Width Modulation Integrated Circuit PWM-IC.

6. The apparatus of claim 5, said power being supplied from said computer system to said tube via said signal cable.

\* \* \* \* \*